(12) United States Patent
Martin

(10) Patent No.: US 6,932,302 B2
(45) Date of Patent: Aug. 23, 2005

(54) REUSABLE LAUNCH SYSTEM

(75) Inventor: James A. Martin, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 54 days.

(21) Appl. No.: 10/325,522

(22) Filed: Dec. 19, 2002

(65) Prior Publication Data

US 2005/0045772 A1 Mar. 3, 2005

(51) Int. Cl.$^7$ .................................................. B64G 1/14
(52) U.S. Cl. ..................... 244/158 R; 244/160; 244/172
(58) Field of Search .............................. 244/158 R, 163, 244/172, 2, 160, 162, 161

(56) References Cited

U.S. PATENT DOCUMENTS

| | | | | |
|---|---|---|---|---|
| 3,295,789 A | * | 1/1967 | Hill | 244/161 |
| 3,369,771 A | * | 2/1968 | Walley et al. | 244/161 |
| 3,534,924 A | * | 10/1970 | Spencer, Jr. et al. | 244/161 |
| 3,702,688 A | * | 11/1972 | Faget | 244/161 |
| 5,129,602 A | * | 7/1992 | Leonard | 244/172 |
| 6,193,187 B1 | * | 2/2001 | Scott et al. | 244/2 |
| 6,360,994 B2 | * | 3/2002 | Hart et al. | 244/160 |
| 6,557,803 B2 | * | 5/2003 | Carpenter et al. | 244/162 |

* cited by examiner

Primary Examiner—Galen Barefoot
(74) Attorney, Agent, or Firm—Harness Dickey & Pierce P.L.C.

(57) ABSTRACT

A reusable space launch system having a reusable booster, a reusable orbiter, and a reusable third vehicle. The booster and orbiter provide ascent propulsion to put the third vehicle in orbit. The booster, orbiter and third vehicle each non-destructively return to earth independently of one another. The booster, orbiter and third vehicle can be refurbished and used in another space launch system as desired. The third vehicle is either a cargo containing vehicle or a crew transfer vehicle. The crew transfer vehicle is substantially the cargo containing vehicle with a crew module in the payload bay.

40 Claims, 3 Drawing Sheets

REUSABLE LAUNCH SYSTEM

FIELD OF THE INVENTION

The present invention relates to space launch systems and more particularly to reusable space launch systems.

BACKGROUND OF THE INVENTION

Typical space launch systems include multiple vehicles that are attached together and perform differing functions in delivering/retrieving a payload (either cargo and/or a crew) to and from orbit. For example, the space shuttle system operated by the National Aeronautics and Space Administration is comprised of four vehicles: (1) an orbiter (commonly referred to as the space shuttle) with three (3) main propulsion engines; (2) an external tank; and (3) two (2) solid rocket boosters. The boosters are attached to the external tank which is attached to the orbiter. The boosters are solid propellant motors that provide initial ascent propulsion (along with the main engines) for about two minutes of flight then separate from the external tank (and orbiter) and descend by parachute into the Atlantic Ocean. The boosters are recovered by ship, returned to land, and refurbished for reuse. The external tank provides liquid oxygen and liquid hydrogen to the main engines on the orbiter during initial ascent and separates from the space shuttle system prior to reaching orbit. The external tank destructively returns to earth independently of the orbiter. The orbiter, using the main engines and an onboard propellant supply, continues to propel itself into orbit where it delivers/retrieves a payload. The orbiter after completing its task(s) non-destructively returns to earth and glides to a horizontal landing at a designated landing site. The orbiter is then refurbished for reuse in another space launch.

Each of the various vehicles that comprise a space launch system requires extensive engineering and testing to ensure that the vehicle and the various components that make up that vehicle can safely perform their intended functions. Prior art space launch systems have designed each the vehicles significantly differently. Each of the different designs requires individual analysis of each of the components (engines, fuel/oxidant supplies, aerodynamics, avionics packages, landing gear, life support, etc.) that comprise each of the vehicles. Designing, analyzing, developing, testing, etc. of each the different designs and components requires large expenditures of money and time. Additionally, because of the differences in the vehicles and the components, personnel that operate and maintain these vehicles require extensive training for each of the individual vehicles and components. Thus, the different designs increase the cost and complexity of the space launch system.

Accordingly, it is desirable for the various vehicles that comprise the space launch system to share some common components, features or parts and/or vehicle design so that the time and cost to develop, maintain and operate the various vehicles and the space launch system is reduced. That is, having commonality between the various vehicles in a space launch system enables common aspects or components of the vehicles to be designed, developed, tested, and built with less labor hours and less cost. Additionally, the cost to operate, inspect and maintain these common components will also be reduced because personnel trained to operate, inspect and maintain the components in one vehicle can also be used to operate, inspect and maintain the common components in different vehicles. Thus, commonality between the vehicles can reduce the cost to design, build, operate and maintain a space launch system.

In addition to the use of common components in the various vehicles that comprise a space launch system, cost savings can also be obtained by using all reusable vehicles in the space launch system. That is, typical space launch systems include vehicles that are destroyed during the space launch operation or require expensive retrieval (water landing vehicles). The destructive use of these vehicles in a space launch system requires these vehicles to be replaced each time a new space launch is to be performed. If the vehicles used in the space launch system can be reused, the cost to supply new vehicles each time a space launch is to be performed can be avoided. Additionally, if the reusable vehicles return to earth and land at a designated land based area, the cost of ocean retrieval can be avoided thus further reducing the cost of operating the space launch system. Accordingly, it is desirable to provide a space launch system that uses reusable vehicles that return to earth and land at a designated land based area.

SUMMARY OF THE INVENTION

A space launch system according to the principles of the present invention provides varying degrees of commonality between the vehicles that comprise the space launch system. Additionally, a space launch system according to the principles of the present invention also provides for vehicles that are reusable thus reducing the operating cost of the space launch system.

A reusable launch system, according to the principles of the present invention, includes first, second and third reusable vehicles that are connected together and that each have an onboard fuel supply and a propulsion engine. The first vehicle is operable to propel the first, second and third vehicles from a launch site to a first staging location below low earth orbit using the propulsion engine on the first vehicle. The first vehicle separates from the second and third vehicles at the first staging location and non-destructively returns to earth independently of the second and third vehicles. The second vehicle is operable to propel the second and third vehicles from the first staging location to a first orbit using the propulsion engine on the second vehicle. The second vehicle separates from the third vehicle at the first orbit and non-destructively returns to earth independently of the first and third vehicles. The third vehicle is operable to independently propel itself from the first orbit to a second orbit higher than the first orbit using the propulsion engine on the third vehicle. The third vehicle also non-destructively returns to earth independently of the first and second vehicles. The third vehicle is also operable to perform at least one of deliver a payload in orbit and retrieve a payload in orbit. The third vehicle can be either a cargo carrying vehicle or a crew carrying vehicle.

The present invention also discloses a method of operating a reusable launch system that has first, second and third reusable vehicles that each have an onboard fuel supply and a propulsion engine. The method includes: (1) propelling the first, second and third vehicles from a launch site to a first staging location with the propulsion engine on the first vehicle; (2) separating the first vehicle from the second and third vehicles at the first staging location; (3) non-destructively returning the first vehicle to earth independently of the second and third vehicles; (4) propelling the second and third vehicles from the first staging location to a first orbit with the propulsion engine on the second vehicle; (5) separating the second vehicle from the third vehicle; (6) non-destructively returning the second vehicle to earth independently of the first and third vehicles; (7) propelling the third vehicle to a second orbit different from the first orbit with the propulsion engine on the third vehicle; (8) performing at least one of delivering a payload and retrieving a payload in orbit with the third vehicle; and (9) non-destructively returning the third vehicle to earth independently of the first and second vehicles.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1A:
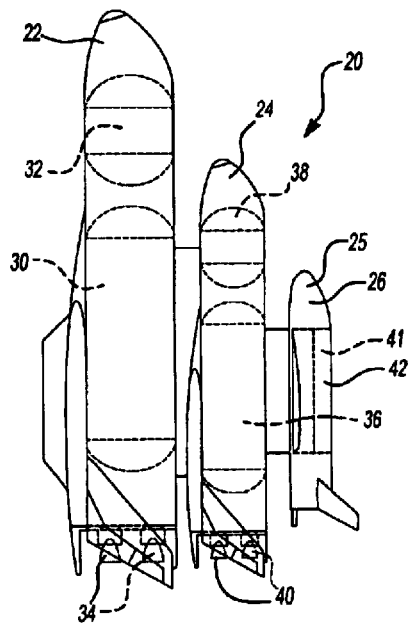
FIGS. 1A–B are schematic representations the preferred embodiment of a reusable launch system according to the principles of the present invention with a cargo containing vehicle and a crew transfer vehicle respectively.
Figure 1B:
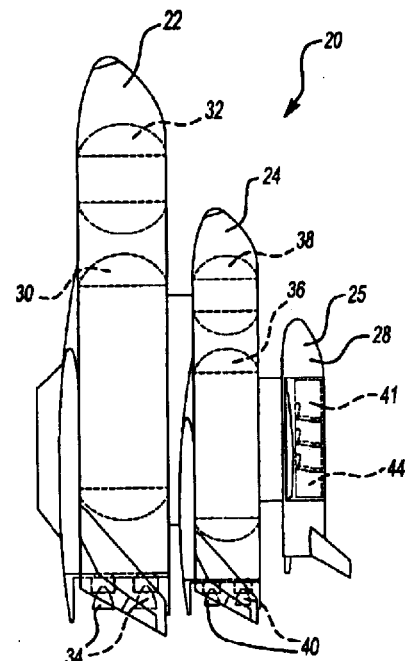

By way of overview and with reference to FIG. 1A and B, a reusable launch system 20 includes a first vehicle 22 which is a booster, a second vehicle 24 which is an orbiter, and a third vehicle 25 which can be either a cargo containing vehicle (CCV) 26 (FIG. 1A) or a crew transfer vehicle (CTV) 28 (FIG. 1B). The cargo containing vehicle 26 and crew transfer vehicle 28 are interchangeable with one another and either can be used with booster 22 and orbiter 24. Reusable launch system 20 provides a system to place third vehicle 25 into orbit wherein a payload (cargo such as a satellite or supplies in the case of a CCV 26 or crew in the case of a CTV 28) can be deployed/retrieved or transferred to/from another vehicle in orbit and then return to earth. Booster 22, orbiter 24, and third vehicle 25 are all attached to one another during the launch and separate from another at predetermined times or locations as described below.

Booster 22 has an onboard fuel supply that consists of a fuel 30, such as liquid hydrogen or densified kerosene (or both in the case of a tripropellant booster), and an oxidant 32, such as liquid oxygen. Booster 22 also has propulsion engines 34 that burn fuel 30 and oxidant 32 to provide thrust for reusable launch system 20. Booster 22 provides ascent propulsion (thrust) to lift booster 22, orbiter 24, and third vehicle 25 to a first staging location (altitude, speed, and/or downrange position). In the first staging location, booster 22 separates from orbiter 24 and third vehicle 25 and non-destructively returns back to the earth independently of orbiter 24 and third vehicle 25. Booster 22 can separate from orbiter 24 and third vehicle 25 in a variety of ways known in the art. For example, explosive bolts can be used to hold booster 22 to orbiter 24 and third vehicle 25 that explode when triggered, to release booster 22 from orbiter 24 and third vehicle 25.

Booster 22 can be configured to non-destructively return to earth in a number of different manners. For example, booster 22 can be designed to separate from orbiter 24 and third vehicle 25 at about Mach 3. Booster 22 can then aerodynamically glide back to the launching site or an area in close proximity to the launching site from which reusable system 20 was deployed. Another option is that booster 22 can be designed to separate from orbiter 24 and third vehicle 25 at about Mach 6 and using an air-breathing engine, such as a turbofan engine, fly back to a landing site which may be the same as the site from which reusable launch system 20 was originally deployed or a different site. Also, booster 22 can be designed to separate from orbiter 24 and third vehicle 25 at about Mach 5 and using its main propulsion engines 34 rocket itself back toward the launch site and land at a landing site which may be the same as the site from which reusable launch system 20 was originally deployed or a different site. Finally, booster 22 can be designed to separate from orbiter 24 and third vehicle 25 at about Mach 14 and glide to a downrange landing site. Preferably, booster 24 glides back to earth and lands in a horizontal orientation. Alternatively, when booster 24 uses its propulsion engines 34 to rocket back to the landing site, booster 24 can be designed to land vertically.

Orbiter 24 also has onboard fuel and oxidant supplies 36 and 38. Propulsion engines 40 on orbiter 24 use the fuel and oxidant supplies 36 and 38 to provide propulsion to propel obiter 24 and third vehicle 25 from the first staging location to a first orbit, which is a low earth orbit, independently of booster 22. Optionally, as discussed in more detail below, orbiter 24 can also be operated to provide ascent propulsion in conjunction with booster 22 to the first staging location. That is, propulsion engines 40 on orbiter 24 can be operated in parallel and simultaneously with propulsion engines 34 on booster 22 to lift the booster 22, orbiter 24, and third vehicle 25 from the launch site to the first staging location and then continue to provide propulsion to propel orbiter 24 and third vehicle 25 to the first orbit after booster 22 has separated from orbiter 24 and third vehicle 25. Once in the first orbit, orbiter 24 separates from third vehicle 25. Orbiter 24 can separate from third vehicle 25 in a variety of ways known in the art. For example, orbiter 24 can be connected to third vehicle 25 with explosive bolts that explode when triggered and detaches orbiter 24 from third vehicle 25. Orbiter 24 can remain in the first orbit for a period of time and then non-destructively return to the earth at the best opportunity. Preferably, orbiter 24 slows itself down and falls/glides back to the earth using atmospheric friction and heat to further slow down, similar to the space shuffle, and horizontally lands at a designated landing area. Alternatively, orbiter 24 can be designed to perform a vertical landing at the designated landing area.

Because the purpose of orbiter 24 is to propel third vehicle 25 to the first orbit, orbiter 24 has very little in-orbit functionality. With the limited in-orbit functionality, orbiter 24 is not capable of deploying/retrieving/transferring payloads in orbit. Orbiter 24 may, however, have some in-orbit functionality, such as a reaction control system to move or roll orbiter 24 and along with propulsion engines 40 provide some maneuvering capability when in orbit to allow orbiter 24 to remain in orbit until the best opportunity to non-destructively return to earth arises.

Third vehicle 25, preferably, is a manned vehicle with a crew area (not shown) that supports a crew of a size sufficient to perform the intended task(s)/functions of third vehicle 25. Alternatively, third vehicle 25 can be an unmanned vehicle, except when third vehicle 25 is a crew transfer vehicle 28 as described below, and be remotely operated and controlled. Third vehicle 25 has a cargo bay 41 that is enclosed by cargo bay doors 42. Cargo bay 41 is designed to receive a variety of payloads that will vary depending upon whether third vehicle 25 is operated as a cargo containing vehicle 26, as shown in FIG. 1A, or a crew transfer vehicle 28, as shown in FIG. 1B. For example, when third vehicle 25 is a cargo containing vehicle 26, some of the payloads that cargo bay 41 can contain, include but are not limited to a satellite, a space station component, and a supply container. When third vehicle 25 is a crew transfer vehicle 28, a crew module 44, discussed below, is positioned in cargo bay 41. A unique and novel feature of third vehicle 25, according to the principles of the present invention, is that regardless of whether third vehicle 25 is a cargo containing vehicle 26 or a crew transfer vehicle 28, third vehicle 25 is substantially the same vehicle. Specifically, crew transfer vehicle 28 is a cargo containing vehicle 26 with a crew module 44 positioned in the cargo bay 41 of cargo containing vehicle 26. Preferably, crew module 44 is a self-contained module that provides environmental control and life support systems to allow a crew of humans to be launched into orbit and returned to earth. Optionally, crew module 44 can be partially self-contained and rely upon components and/or systems that are located on cargo containing vehicle 26, such as an electrical or hydraulic power system. Thus, third vehicle 25 can be a cargo containing vehicle 26 or, with the addition of crew module 44 to the cargo bay 41 of cargo containing vehicle 26, can be a crew transfer vehicle 28. Crew module 44 is shown in the Figures as having seats to symbolize that crew members will reside in crew module 44. It should be appreciated, however, that the seats shown are enlarged for illustrative purposes only and should not be construed as indicative of the relative sizes of the various vehicles and components.

The function of third vehicle 25 is to perform in-orbit task(s). For example, when third vehicle 25 is a cargo containing vehicle 26, third vehicle 25 is capable of deploying and/or retrieving payloads, such as satellites, space station modules and cargo, while in orbit. When third vehicle 25 is a crew transfer vehicle 28, third vehicle 25 is capable of transferring a crew between crew module 44 and another vehicle in orbit. To perform these in-orbit task(s), third vehicle 25 has significant in-orbit functionality. For example, third vehicle 25 has an orbital maneuvering system (OMS) (not shown) that includes propulsion engines (not shown) that provide thrust to make significant changes in orbit parameters, such as altitude and inclination changes. The OMS propulsion engines can also be used to slow third vehicle 25 down (while in orbit) to allow gravity to pull third vehicle 25 back toward earth and glide to the designated landing site. The OMS propulsion engines can be designed to operate on a variety of fuels. For example, the propulsion engines can be designed to operate on nitrogen tetroxide and monomethyl hydrazine or on hydrogen and oxygen. Third vehicle 25 also has a reaction control system (RCS) (not shown) that provides for minor changes in orbit parameters such as attitude adjustments. Thus, the OMS and RCS systems allow third vehicle 25 to perform its desired function of delivering/retrieving/transferring payloads in orbit. In addition to the OMS and RCS, third vehicle 25 also has an avionics hardware package and a software package that provide the required data and instructions for controlling the OMS and RCS.

In addition to the OMS and RCS, the third vehicle, optionally, can be equipped with fuel and oxidant supplies (shown in FIGS. 3A–5B and indicated as 46 and 48 with various primes) and main ascent propulsion engine(s) (shown in FIGS. 2A–5B and indicated as 50 with various primes). When equipped with main ascent propulsion engine(s), the third vehicle, as designed and as desired, can provide a supplemental lift/thrust to assist in propelling the booster, orbiter, and third vehicle from the launch site to the first staging position and/or to assist in propelling the orbiter and third vehicle from the first staging position to the first orbit, as discussed below. Additionally, the main ascent propulsion engine(s) can also serve as the propulsion engine(s) for the OMS. In other words, the OMS can use the main ascent propulsion engine(s) to provide significant changes in orbit parameters. Thus, the third vehicle has at least one propulsion engine (OMS and/or main ascent) and onboard fuel and oxidant supplies that allow the at least one propulsion engine to make significant changes in the orbital parameters and, optionally, provide supplemental ascent lift/thrust.

After third vehicle 25 has performed its task, third vehicle 25 non-destructively returns back to earth independently of booster 22 and orbiter 24. Third vehicle 25 can use its propulsion engines 50, and/or its OMS to slow itself down and allow gravity to pull it toward the earth wherein using aerodynamic drag and heating to further slow itself, can glide to a landing site and land horizontally. It should be understood, however, that third vehicle 25 can be designed to land vertically and still be within the scope of the invention.

Referring now to FIGS. 1A and B, the preferred embodiment of the reusable launch system 20 according to the principles of the present invention is shown. Third vehicle 25 is attached to orbiter 24 which in turn is attached to booster 22. In this embodiment, booster 22 and orbiter 24 both provide ascent propulsion from the launch site to the first staging position. In other words, propulsion engines 34 on booster 22 and propulsion engines 40 on orbiter 24 operate in parallel and fire simultaneously to both provide ascent propulsion to lift booster 22, orbiter 24, and third vehicle 25 from the launch site to the first staging location. Preferably, the fuel and oxidant supplies 30 and 32 on booster 22 are cross fed to orbiter 24 so that propulsion engines 40 on orbiter 24 burn fuel and oxidant from booster 22. The cross feeding of the fuel and oxidant supplies 30 and 32 on booster 22 to orbiter 24 allows orbiter 24 to have a large amount of fuel in its fuel and oxidant supplies 36 and 38 upon separation with booster 22. It should be understood, however, that fuel and oxidant supplies 30 and 32 on booster 22 do not need to be cross fed to orbiter 24 to be within the scope of the present invention. It should also be understood that booster 22 can be operated to provide all of the ascent propulsion to lift booster 22, orbiter 24 and third vehicle 25 from the launch site to the first staging location wherein propulsion engines 40 on orbiter 24 will then be operated to provide ascent propulsion and still be within the scope of the invention.

When booster 22, orbiter 24, and third vehicle 25 reach the first staging location, booster 25 separates from orbiter 24 and third vehicle 25. Booster 22 then non-destructively returns to earth, in one of the manners discussed above. After returning to earth, booster 22 can be refurbished and used as a booster in another reusable launch system, as desired. After separating from booster 22, orbiter 24 and third vehicle 25 remain attached to one another and are propelled via propulsion engines 40 on orbiter 24 from the first staging location to the first orbit. That is, propulsion engine 40 on orbiter 24 utilizing onboard fuel and oxidant supplies 36 and 38 propels orbiter 24 and third vehicle 25 from the first staging location to a first orbit. Upon reaching the first orbit, orbiter 24 and third vehicle 25 separate from one another. Orbiter 24 can then continue to orbit the earth in the first orbit while awaiting for an opportunity to non-destructively return to earth. When orbiter 24 reaches a position that is opportune for returning to earth, orbiter 24 proceeds to use its RCS, if so equipped, and its propulsion engines 40 to guide itself back toward earth and, using aerodynamic drag and heat for braking, can glide back to a desired landing site. Preferably, orbiter 24 lands horizontally. After returning to earth, orbiter 24 can be refurbished and used as an orbiter in another reusable launch system, as desired.

After separating from orbiter 24, third vehicle 25 can then perform its task(s) of deploying/retrieving a payload when configured as a cargo containing vehicle 26 or delivering/retrieving a crew payload when configured as a crew transfer vehicle 28 with a crew module 44. To perform its task(s), third vehicle 25 can propel itself via its OMS to a second orbit, as required. After performing its task(s), third vehicle 25 using its OMS, slows itself down and falls toward earth and, at the right opportunity, reenters the earth's atmosphere. Third vehicle 25 utilizing aerodynamic drag and heat further slows itself down and glides to a desired landing site on the earth. Preferably, third vehicle 25 glides to a horizontal landing. Third vehicle 25 can then be refurbished and used in another reusable launch system, as desired. Thus, the preferred embodiment of the reusable launch system 20 according to the principles of the present invention provides the capability of delivering/retrieving/transferring a payload in orbit using three vehicles that each non-destructively return to earth independently of each other and are reusable.

Figure 2A:
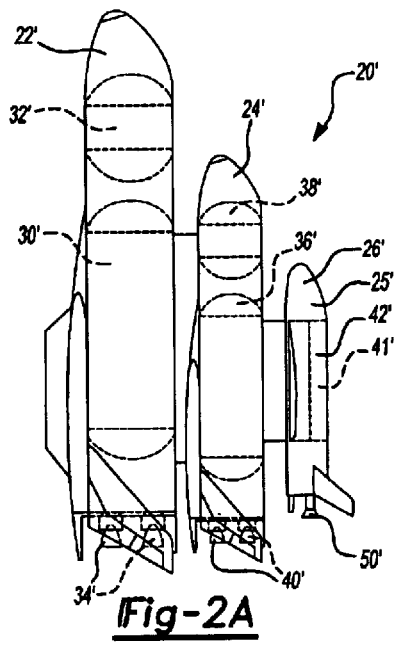
FIGS. 2A–B are schematic representations of a first alternate embodiment of a reusable launch system according to the principles of the present invention with a cargo containing vehicle and a crew transfer vehicle respectively.
Figure 2B:
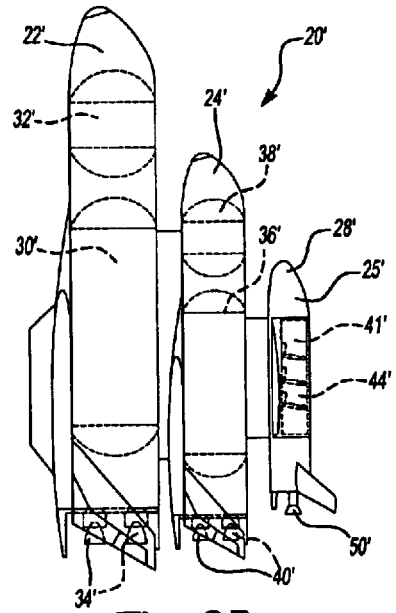

Referring now to FIGS. 2A–B, a first alternate embodiment of a reusable launch system 20' according to the principles of the present invention is shown. In the first alternate embodiment of reusable launch system 20' booster 22' and orbiter 24' are the same as those discussed above with reference to the preferred embodiment of reusable launch system 20 shown in FIGS. 1A–B. Accordingly, booster 22' and orbiter 24' will not be discussed in detail in reference to reusable launch system 20'. Third vehicle 25', however, is different than third vehicle 25 in the preferred embodiment of reusable launch system 20 shown in FIGS. 1A–B.

Third vehicle 25', like third vehicle 25, discussed above, can be either a cargo containing vehicle 26', as shown in FIG. 2A, or a crew transfer vehicle 28', as shown in FIG. 2B when equipped with a crew module 44'. The difference between third vehicle 25' and third vehicle 25 is that in the first alternate embodiment, third vehicle 25' has main ascent propulsion engines 50' that assist in providing main ascent propulsion to reusable launch system 20'.

When reusable launch system 20' is launched to propel third vehicle 25' into orbit to perform its intended task(s), propulsion engines 34' on booster 22' and, optionally, propulsion engines 40' on orbiter 24' and propulsion engines 50' on third vehicle 25' are operated to propel booster 22', orbiter 24', and third vehicle 25' from the launch site to the first staging location. Upon reaching the first staging location, booster 22' separates from orbiter 24' and third vehicle 25' and independently non-destructively returns to earth. After returning to earth, booster 22' can be refurbished and used as a booster in another reusable launch system, as desired. Propulsion engines 40' on orbiter 24' are then used in conjunction with propulsion engines 50' on third vehicle 25' to propel orbiter 24' and third vehicle 25' from the first staging location to the first orbit. Propulsion engines 40' burn fuel and oxidant from the fuel and oxidant supplies 36' and 38' onboard the orbiter 24'. Propulsion engines 50' on third vehicle 25' can burn fuel and oxidant from the fuel and oxidant supplies 46' and 48' on third vehicle 25'. Alternatively, fuel and oxidant supplies 36' and 38' on orbiter 24' can be cross fed to third vehicle 25' so that propulsion engines 50' on third vehicle 25' burn fuel and oxidant from the fuel and oxidant supplies 36' and 38' onboard orbiter 24' when propelling orbiter 24' and third vehicle 25' from the first staging location to the first orbit. The cross feeding the fuel and oxidant supplies 36' and 38' on orbiter 24' to third vehicle 25' enables third vehicle 25' to have a larger amount of fuel in its fuel and oxidant supplies 46' and 48' upon reaching the first orbit.

Upon reaching the first orbit, orbiter 24' separates from third vehicle 25'. Orbiter 24' then orbits the earth in the first orbit until an opportunity arises for returning back to earth. When the opportunity arises, orbiter 24' non-destructively returns to earth independently of third vehicle 25' and booster 22', as discussed above with reference to the preferred embodiment of reusable launch system 20. After returning to earth, orbiter 24' can be refurbished and used as an orbiter in another reusable launch system, as desired.

After separating from orbiter 24', third vehicle 25' can then propel itself via its propulsion engines 50' and/or OMS to a second orbit to perform its intended task. After performing its intended task, third vehicle 25' uses its propulsion engines 50' and/or OMS, to non-destructively returns to earth, in the same manner discussed above with reference to third vehicle 25 in reusable launch system 20. Third vehicle 25' can then be refurbished and used in another reusable launch system, as desired.

Because third vehicle 25' has main ascent propulsion engines 50', third vehicle 25', as mentioned above, can also be used to supplement the ascent propulsion from the launch site to the first staging location. In other words, propulsion engines 50' on third vehicle 25' can be operated in parallel and simultaneously with propulsion engines 34' on booster 22' and propulsion engines 40' on orbiter 24' to assist in propelling booster 22', orbiter 24', and third vehicle 25' from the launch site to the first staging location. Preferably, fuel and oxidant supplies 30' and 32' on booster 22' or fuel and oxidant supplies 36' and 38' on orbiter 24' are cross fed to third vehicle 25' so the fuel and oxidant supplies 46' and 48' on third vehicle 25' are not consumed during the ascent from the launch site to the first staging location. However, it should be understood that the cross feeding of fuel and oxidant supplies 30' and 32' onboard booster 22' or fuel and oxidant supplies 36' and 38' onboard orbiter 24' to third vehicle 25' is not required to be within the scope of the present invention.

Thus, reusable launch system 20' utilizes a third vehicle 25' that assists in providing ascent propulsion from the first staging location to the first orbit. Furthermore, third vehicle 25' can also be utilized to assist in providing ascent propulsion from the launch site to the first staging location in addition to providing ascent propulsion from the first staging location to the first orbit.

Figure 3A:
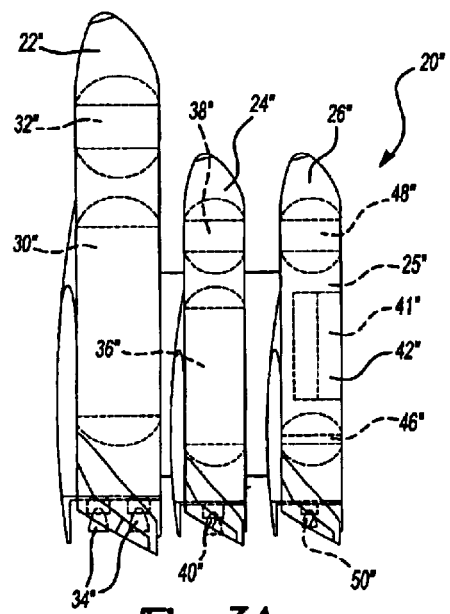
FIGS. 3A–B are schematic representations of a second alternate embodiment of a reusable launch system according to the principles of the present invention with a cargo containing vehicle and a crew transfer vehicle respectively.
Figure 3B:
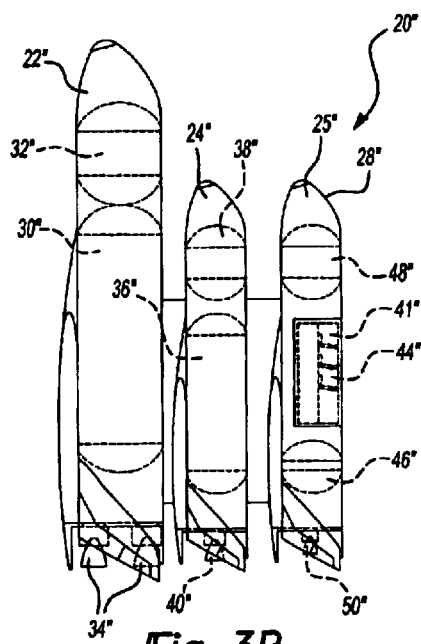

Referring now to FIGS. 3A–B, a second alternate embodiment of reusable launch system 20" is shown. Reusable launch system 20" uses commonality between two of the vehicles to provide a reusable launch system 20" whose development and maintenance costs are reduced due to the commonality. Specifically, in reusable launch system 20", orbiter 24" and third vehicle 25" share a commonality while booster 22" does not. Booster 22" has the same functional and operational performance as boosters 22 and 22' used in reusable launch systems 20 and 20'. As such booster 22" is not discussed in detail with reference to reusable launch system 20".

As stated above, in reusable launch system 20", orbiter 24" and third vehicle 25" share a commonality. Specifically, orbiter 24" and third vehicle 25" preferably have an external geometry that is substantially identical. That is, the size, shape and dimensions of orbiter 24" are substantially the same as the size, shape and dimensions of third vehicle 25". By utilizing the same external geometry, the development, operating and maintenance costs of orbiter 24" and third vehicle 25" can be reduced. In addition to having a substantially identical external geometry, orbiter 24" and third vehicle 25" can also have other features or components in common to further reduce costs. For example, orbiter 24" and third vehicle 25" can have the same avionics hardware package, the same propulsion engines 40" and 50", utilize the same propellants, and landing gear (not shown). As the commonality between orbiter 24" and third vehicle 25" increases, the cost to develop, operate and maintain the vehicles decreases. However, the use of commonality between the vehicles needs to be balanced against the cost of providing vehicles having equipment and/or capabilities that exceed the requirements for the task(s) to be performed by the specific vehicle. Thus, the extent of commonality between orbiter 24" and third vehicle 25" will vary depending upon the design specifications of the reusable launch system 20".

Third vehicle 25", as discussed above with reference to reusable launch systems 20 and 20', can be provided as either a cargo containing vehicle 26", as shown in FIG. 3A, or a crew transfer vehicle 28", as shown in FIG. 3B. Again, when third vehicle 25" is provided as a crew transfer vehicle 28", it is essentially cargo containing vehicle 26" with a crew module 44" provided in cargo bay 41".

In operating reusable launch system 20", booster 22" is used to provide ascent propulsion via propulsion engines 34" using fuel and oxidant supplies 30" and 32" to propel orbiter 24" and third vehicle 25" from the launch site to the first staging location. Upon reaching the first staging location, booster 22" separates from orbiter 24" and third vehicle 25" and independently non-destructively returns to earth. After returning to earth, booster 22" can be refurbished and used as a booster in another reusable launch system, as desired. Orbiter 24" and third vehicle 25" are then propelled from the first staging location to the first orbit via propulsion engines 40" using fuel and oxidant supplies 36" and 38" on orbiter 24". Upon reaching the first orbit, orbiter 24" separates from third vehicle 25" and orbits the earth in the first orbit. Orbiter 24" then non-destructively returns to earth independently of booster 22" and third vehicle 25" at the appropriate opportunity. Orbiter 24" returns to earth in the same or similar manner as that discussed above with reference to reusable launch systems 20 and 20'. After returning to earth, orbiter 24" can be refurbished and used as an orbiter in another reusable launch system, as desired. Third vehicle 25", using propulsion engines 50" and/or its OMS can then proceed from the first orbit to a second orbit to perform its task(s). After performing its task(s), third vehicle 25" then non-destructively returns to earth independently of booster 22" and orbiter 24". Third vehicle 25" returns to earth in the same or similar fashion to that discussed above with reference to third vehicle 25 and 25' in reusable launch systems 20 and 20'. Third vehicle 25" can then be refurbished and used in another reusable launch system, as desired.

Third vehicle 25" can also be used to provide supplemental ascent propulsion. Propulsion engines 50" on third vehicle 25" can be operated in parallel and simultaneously with propulsion engines 40" on orbiter 24" to propel orbiter 24" and third vehicle 25" from the first staging location to the first orbit. Optionally, fuel and oxidant supplies 36" and 38" on orbiter 24" can be cross fed to third vehicle 25" so that propulsion engines 50" burn fuel and oxidant from orbiter 24" to maintain sufficient fuel and oxidant within third vehicle 25" to complete its intended task(s). Additionally, third vehicle 25" and orbiter 24" can also be operated to provide supplemental ascent propulsion to help booster 22" propel booster 22", orbiter 24", and third vehicle 25" from the launch site to the first staging location. Specifically, propulsion engines 50" and 40" on third vehicle 25" and orbiter 24" can be operated in parallel and simultaneously with propulsion engines 34" on booster 22" to help propel booster 22", orbiter 24" and third vehicle 25" from the launch site to the first staging location. Optionally, fuel and oxidant supplies 30" and 32" on booster 22" can be cross fed to orbiter 24" and/or third vehicle 25" to provide orbiter 24" and third vehicle 25" with a desired amount of remaining fuel upon reaching the first staging location.

Figure 4A:
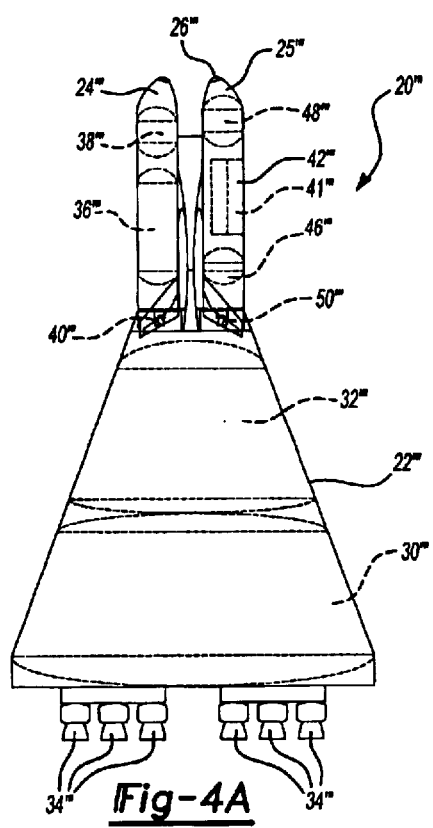
FIGS. 4A–B are schematic representations of a third alternate embodiment of a reusable launch system according to the principle of the present invention with a cargo containing vehicle and a crew transfer vehicle respectively.
Figure 4B:
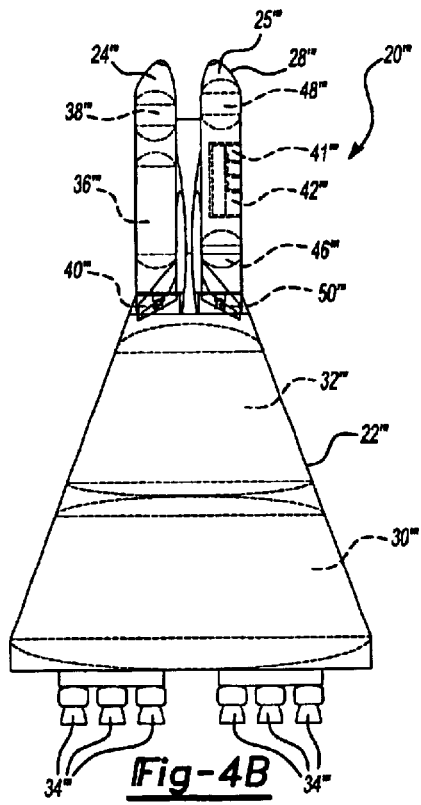

Referring now to FIGS. 4A–B, a third alternate embodiment of a reusable launch system 20''' is shown. Reusable launch system 20''' is similar to reusable launch system 20" of FIGS. 3A–B in that the orbiter 24''' and third vehicle 25''' have the same commonality as the orbiter 24" and third vehicle 25" of reusable launch system 20". Specifically, orbiter 24''' and third vehicle 25''' have the same external geometry as one another. Additionally, orbiter 24''' and third vehicle 25''' can have additional commonality, such as the same avionics hardware, propulsion engines 40''' and 50''', landing gear, etc. The difference, however, is that booster 22''' of FIGS. 4A–B, is of a different configuration than that of booster 22, 22' and 22" used in the above described reusable launch systems 20, 20', and 20". Additionally, orbiter 24''' and third vehicle 25''' do not provide supplemental ascent propulsion from the launch site to the first staging location, as described below.

Third vehicle 25''' as discussed above with reference to reusable launch systems 20, 20' and 20", can be provided as either a cargo containing vehicle 26''', as shown in FIG. 4A, or a crew transfer vehicle 28''', as shown in FIG. 4B. Again, when third vehicle 25''' is provided as a crew transfer vehicle 28''', it is essentially cargo containing vehicle 26''' with a crew module 44''' provided in cargo bay 41'''.

When using reusable launch system 20''', booster 22''' provides the main ascent propulsion via propulsion engines 34''' using fuel and oxidant supplies 30''' and 32''' to propel booster 22''', orbiter 24''', and third vehicle 25''' from the launch site to the first staging location. Upon reaching the first staging location, booster 22''' separates from orbiter 24''' and third vehicle 25''' and independently and non-destructively returns to earth. Booster 22''' in the configuration shown, separates from orbiter 24''' and third vehicle 25''' at about Mach 17 and proceeds to land vertically at a down-range landing site using propulsion engines 34'''. After returning to earth, booster 22''' can be refurbished and used as a booster in another reusable launch system, as desired.

Orbiter 24''' then proceeds to propel orbiter 24''' and third vehicle 25''' from the first staging location to a first orbit via propulsion engines 40''' using the fuel and oxidant supplies 36''' and 38''' on orbiter 24'''. Optionally, third vehicle 25''' as discussed above with reference to reusable launch system 20'', can provide supplemental ascent propulsion via propulsion engines 50''' that burn in parallel and simultaneously with propulsion engines 40''' on orbiter 24''' to assist in the propulsion or orbiter 24''' and third vehicle 25''' from the first staging location to the first orbit. Upon reaching the first orbit, orbiter 24''' separates from third vehicle 25''' and continues to orbit the earth in the first orbit. At the best opportunity, orbiter 24''' then returns to earth, as discussed above with reference to reusable launch systems 20, 20' and 22''. After returning to earth, orbiter 24''' can be refurbished and used as an orbiter in another reusable launch system, as desired. Third vehicle 25''' can then proceed to a second orbit using propulsion engines 50''' and/or its OMS to perform its intended task. Upon completing its intended task, third vehicle 25''' then non-destructively returns to earth independently of orbiter 24''' and booster 22''', in the same or similar manner discussed above with reference to reusable launch systems 20, 20' and 20''. Third vehicle 25''' can then be refurbished and used in another reusable launch system, as desired.

Figure 5A:
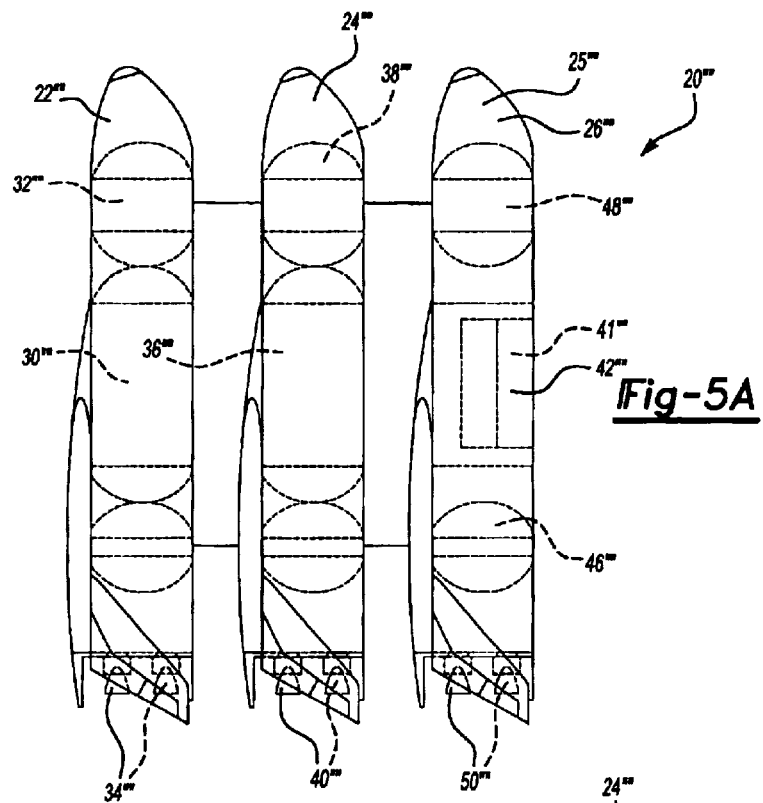
FIGS. 5A–B are schematic representations of a fourth alternate embodiment of a reusable launch system according to the principles of the present invention with a cargo containing vehicle and a crew transfer vehicle respectively.
Figure 5B:
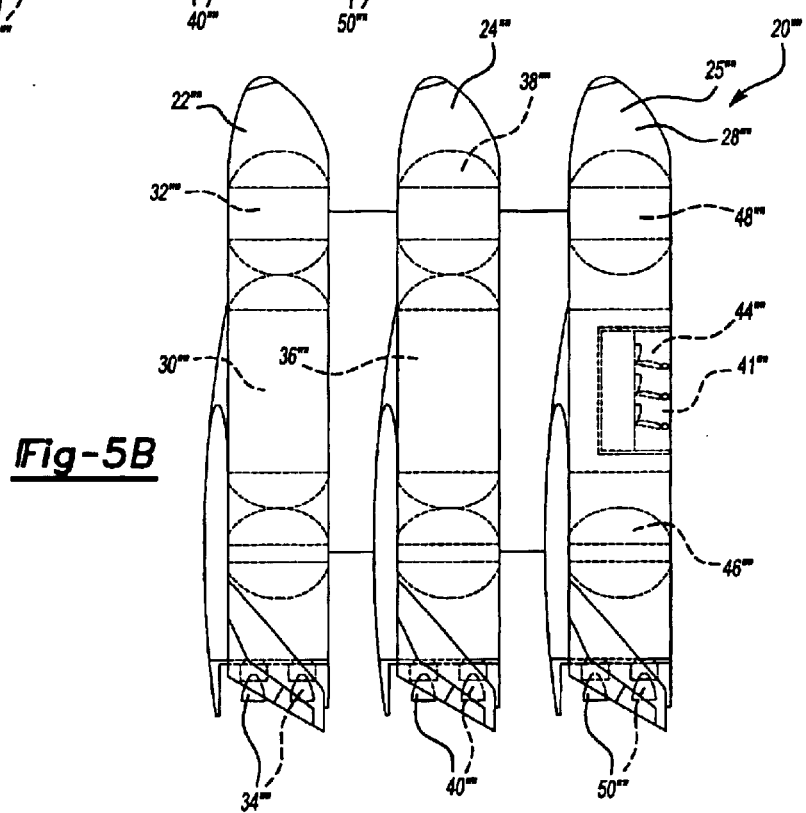

Referring now to FIGS. 5A–B, a fourth alternate embodiment of a reusable launch system 20'''', is shown. In reusable launch system 20'''' booster 22'''', orbiter 24'''', and third vehicle 25'''' all share some commonality to provide a reduced development and operating cost reusable launch system 20''''. Specifically, booster 22'''' has an external geometry (size, shape and dimensions), that is substantially the same as the external geometry of orbiter 24'''' which is substantially the same as the external geometry of third vehicle 25''''. In addition to the same external geometry, booster 22'''', orbiter 24'''', and third vehicle 25'''', can also have additional commonality. For example, propulsion engines 30'''', 40'''', and 50'''', on the respective booster, orbiter and third vehicle 22'''', 24'''', and 25'''', can be substantially the same and use the same propellants. The landing gear (not shown) on the booster 22'''', orbiter 24'''', and third vehicle 25'''' can also be substantially the same. Thus, reusable launch system 20'''' provides additional commonalily between the three vehicles that comprise the system than reusable launch system 20''' discussed above.

Third vehicle 25'''', as discussed above with reference to reusable launch systems 20, 20', 20'', and 20''', can be provided as either a cargo containing vehicle 26'''' or a crew transfer vehicle 28''''. Again, when third vehicle 25'''' is provided as a crew transfer vehicle 28'''', it is essentially cargo containing vehicle 26'''' with a crew module 44'''' provided in cargo bay 41''''.

In operating reusable launch system 20'''', ascent propulsion is preferably provided by booster 22'''', orbiter 24'''', and third vehicle 25''''. That is, propulsion engines 34'''' of booster 22'''', are operated simultaneously and in parallel with propulsion engines 40'''' on orbiter 24'''' and in parallel and simultaneously with propulsion engines 50'''' on third vehicle 25''''. Preferably, fuel and oxidant supplies 30'''' and 32'''' are cross fed to orbiter 24'''' and third vehicle 25'''' so that all three sets of propulsion engines 34'''', 40'''', and 50'''', burn fuel and oxidant from the fuel and oxidant supplies 30'''' and 32'''' on booster 22'''' when ascending from the launch site to the first staging location. However, it should be understood that fuel supplies 30'''' and 32'''' do not need to be cross fed to orbiter 24'''' and third vehicle 25'''' to be within the scope of the present invention. Upon reaching the first staging location, booster 24'''' separates from orbiter 24'''' and third vehicle 25'''' and independently non-destructively returns to earth in the same or similar manner as discussed above with reference to reusable launch systems 20, 20' and 20''. After returning to earth, booster 22'''' can be refurbished and used as a booster in another reusable launch system, as desired. After separating from booster 22'''', orbiter 24'''' and third vehicle 25'''' continue to provide ascent propulsion via propulsion engines 40'''' and 50'''' and proceed from the first staging location to the first orbit. Preferably, fuel and oxidant supplies 36'''' and 38'''' on orbiter 24'''' are cross fed to third vehicle 25'''' so that both propulsion engines 40'''' and 50'''' burn fuel and oxidant from fuel and oxidant supplies 36'''' and 38''''. However, it should be understood that fuel and oxidant supplies 36'''' and 38'''' do not need to be cross fed to third vehicle 25'''' to be within the scope of the present invention.

Upon reaching the first orbit, orbiter 24'''' separates from third vehicle 25'''' and continues to orbit the earth in the first orbit. At the best opportunity, orbiter 25'''' returns to earth in the same or similar manner discussed above with reference to reusable launch systems 20, 20', 20'' and 20'''. After returning to earth, orbiter 24'''' can be refurbished and used as an orbiter in another reusable launch system, as desired. Third vehicle 25'''' can then proceed to propel itself from the first orbit to a second orbit via propulsion engines 50'''' and/or its OMS. Upon reaching the second orbit, third vehicle 25'''' then performs its intended task(s). After performing its task(s), third vehicle 25'''' using its propulsion engines 50'''' and/or OMS proceeds to propel itself back toward earth and non-destructively return to earth independently of orbiter 24'''' and booster 22'''' in the same or similar manner as discussed above with reference to reusable launch system 20, 20', 20'' and 20'''. Third vehicle 25'''' can then be refurbished and used in another reusable launch system, as desired.

Thus, the above described reusable launch systems 20, 20', 20'', 20''', and 2'''' provide launch vehicles which can be used to deliver/retrieve/transfer a payload in orbit. The reusable launch system does so with vehicles that are non-destructively returned to earth to reduce the overall cost of performing the intended task. Additionally, the various vehicles that comprise the reusable launch system according to the principles of the present invention can share various degrees of commonality to reduce development costs and/or operating costs. It should be appreciated that while the vehicles in the reusable launch systems are discussed as using two propellants, the vehicles can use three propellants (tripropellant) and still be within the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reusable launch system comprising:
first, second, and third reusable vehicles connected together and each having an onboard fuel supply and a propulsion engine, characterized in that:
said first vehicle is operable to propel said first, second and third vehicles from a launch site to a first staging location below low earth orbit using said propulsion engine on said first vehicle, separate from said second and third vehicles at said first staging location, and non-destructively return to earth independently of said second and third vehicles;

said second vehicle is operable to propel said second and third vehicles from said first staging location to a first orbit using said propulsion engine on said second vehicle, separate from said third vehicle at said first orbit, and non-destructively return to earth independently of said first and third vehicles;

said third vehicle is operable to independently propel itself from said first orbit to a second orbit higher than said first orbit using said propulsion engine on said third vehicle, non-destructively return to earth independently of said first and second vehicles, and at least one of deliver a payload in orbit and retrieve a payload in orbit; and said third vehicle is at least one of a cargo carrying vehicle and a crew carrying vehicle, wherein said third vehicle is operable to assist in propelling said second and third vehicles from said first staging location to said first orbit using said propulsion engine on said third vehicle.

2. The system of claim 1, wherein said second vehicle is operable to assist in propelling said first, second and third vehicles from said launch site to said first staging location using said propulsion engine on said second vehicle.

3. The system of claim 2, wherein said third vehicle is operable to assist in propelling said first, second and third vehicles from said launch site to said first staging location using said propulsion engine on said third vehicle.

4. The system of claim 1, wherein said cargo carrying vehicle has a payload bay and said crew carrying vehicle is substantially said cargo carrying vehicle with a passenger module in said payload bay.

5. A method of operating a reusable launch system having first, second and third reusable vehicles connected together and each having an onboard fuel supply and a propulsion engine, the method comprising the steps of:

(a) propelling the first, second and third vehicles from a launch site to a first staging location with the propulsion engine on the first vehicle;

(b) separating the first vehicle from the second and third vehicles at said first staging location;

(c) non-destructively returning the first vehicle to earth independently of the second and third vehicles;

(d) propelling the second and third vehicles from said first staging location to a first orbit with the propulsion engines on the second and third vehicles;

(e) separating the second vehicle from the third vehicle;

(f) non-destructively returning the second vehicle to earth independently of the first and third vehicles;

(g) propelling the third vehicle to a second orbit different from said first orbit with the propulsion engine on the third vehicle;

(h) performing at least one of delivering a payload and retrieving a payload in orbit with the third vehicle; and (i) non-destructively returning the third vehicle to earth independently of the first and second vehicles.

6. The method of claim 5, wherein step (a) further comprises propelling the first, second and third vehicles from said launch site to said first staging location with the propulsion engines on the first, second and third vehicles.

7. The method of claim 5, wherein step (a) further comprises propelling the first, second and third vehicles from said launch site to said first staging location with the propulsion engines on the first and second vehicles.

8. The method of claim 5, wherein step (c) further comprises landing the first vehicle on earth.

9. The method of claim 5, wherein step (f) further comprises landing the second vehicle on earth.

10. The method of claim 5, wherein step (i) further comprises landing the third vehicle on earth.

11. The method of claim 5, wherein the third vehicle is a cargo carrying vehicle with a payload bay and further comprising the step of placing a crew carrying module in said payload bay prior to performing step (a).

12. A reusable launch system comprising:

first, second, and third reusable vehicles connected together and each having an onboard fuel supply and a propulsion engine, characterized in that:

said first vehicle is operable to propel said first, second and third vehicles from a launch site to a first staging location below low earth orbit using said propulsion engine on said first vehicle, separate from said second and third vehicles at said first staging location, and non-destructively return to earth independently of said second and third vehicles;

said second vehicle is operable to propel said second and third vehicles from said first staging location to a first orbit using said propulsion engine on said second vehicle, separate from said third vehicle at said first orbit, and non-destructively return to earth independently of said first and third vehicles;

said third vehicle is operable to independently propel itself from said first orbit to a second orbit higher than said first orbit using said propulsion engine on said third vehicle, non-destructively return to earth independently of said first and second vehicles, and at least one of deliver a payload in orbit and retrieve a payload in orbit;

said second vehicle has an external geometry and said third vehicle has an external geometry that is substantially the same as said external geometry of said second vehicle; and said third vehicle is at least one of a cargo carrying vehicle and a crew carrying vehicle.

13. The system of claim 12, wherein said second vehicle has an avionics hardware package, said third vehicle has an avionics hardware package, and said avionics hardware package of said third vehicle is substantially the same as said avionics hardware package of said second vehicle.

14. The system of claim 12, wherein said propulsion engine on said third vehicle is substantially the same as said propulsion engine on said second vehicle.

15. The system of claim 12, wherein said second vehicle has landing gear, said third vehicle has landing gear, and said landing gear on said third vehicle is substantially the same as said landing gear on said second vehicle.

16. The system of claim 12, wherein said second vehicle is operable to assist in propelling said first, second and third vehicles from said launch site to said first staging location using said propulsion engine on said second vehicle.

17. The system of claim 16, wherein said third vehicle is operable to assist in propelling said first, second and third vehicles from said launch site to said first staging location using said propulsion engine on said third vehicle.

18. The system of claim 12, wherein said third vehicle is operable to assist in propelling said second and third vehicles from said first staging location to said first orbit using said propulsion engine on said third vehicle.

19. The system of claim 12, wherein said cargo carrying vehicle has a payload bay and said crew carrying vehicle is substantially said cargo carrying vehicle with a passenger module in said payload bay.

20. A method of deploying and retrieving payloads in orbit comprising the steps of:
 (a) providing a first reusable vehicle having a fuel supply, a propulsion engine, and an external geometry;
 (b) providing a second reusable vehicle having a fuel supply, a propulsion engine, and an external geometry;
 (c) providing a third reusable vehicle having a fuel supply, a propulsion engine, and an external geometry that is substantially the same as said external geometry of said second vehicle;
 (d) connecting said first, second, and third vehicles together;
 (e) propelling said first, second and third vehicles from a launch site to a first staging location with said propulsion engine on said first vehicle;
 (f) separating said first vehicle from said second and third vehicles at said first staging location;
 (g) non-destructively returning said first vehicle to earth independently of said second and third vehicles;
 (h) propelling said second and third vehicles from said first staging location to a first orbit with said propulsion engine on said second vehicle;
 (i) separating said second vehicle from said third vehicle;
 (j) non-destructively returning said second vehicle to earth independently of said first and third vehicles;
 (k) propelling said third vehicle to a second orbit different from said first orbit with said propulsion engine on said third vehicle;
 (l) performing at least one of delivering a payload and retrieving a payload in orbit with said third vehicle; and
 (m) non-destructively returning said third vehicle to earth independently of said first and second vehicles.

21. The method of claim 20, wherein step (e) further comprises propelling said first, second and third vehicles from said launch site to said first staging location with said propulsion engines on said first and second vehicles.

22. The method of claim 21, wherein step (e) further comprises propelling said first, second and third vehicles from said launch site to said first staging location with said propulsion engines on said first, second and third vehicles.

23. The method of claim 20, wherein step (h) further comprises propelling said second and third vehicles from said first staging location to said first orbit with said propulsion engines on said second and third vehicles.

24. The method of claim 20, wherein said third vehicle is a cargo carrying vehicle with a payload bay and further comprising the step of placing a crew carrying module in said payload bay prior to performing step (e).

25. The method of claim 20, wherein step (b) further comprises providing said second vehicle with landing gear and step (c) further comprises providing said third vehicle with landing gear substantially the same as said landing gear on said second vehicle.

26. The method of claim 20, wherein step (b) further comprises providing said second vehicle with an avionics hardware package and step (c) further comprises providing said third vehicle with an avionics hardware package substantially the same as said avionics hardware package on said second vehicle.

27. The method of claim 20, wherein step (a) further comprises providing said first vehicle with an external geometry that is substantially the same as said external geometries of said second and third vehicles.

28. The method of claim 27, wherein:
 step (a) further comprises providing said first vehicle with landing gear;
 step (b) further comprises providing said second vehicle with landing gear substantially the same as said landing gear on said first vehicle; and
 step (c) further comprises providing said third vehicle with landing gear substantially the same as said landing gear on said first and second vehicles.

29. The method of claim 27, wherein:
 step (a) further comprises providing said first vehicle with an avionics hardware package;
 step (b) further comprises providing said second vehicle with an avionics hardware package substantially the same as said avionics hardware package on said first vehicle; and
 step (c) further comprises providing said third vehicle with an avionics hardware package substantially the same as said avionics hardware packages on said first and second vehicles.

30. The method of claim 27, wherein step (e) further comprises propelling said first, second and third vehicles from said launch site to said first staging location with said propulsion engines on said first and second vehicles.

31. The method of claim 30, wherein step (e) further comprises propelling said first, second and third vehicles from said launch site to said first staging location with said propulsion engines on said first, second and third vehicles.

32. The method of claim 27, wherein step (h) further comprises propelling said second and third vehicles from said first staging location to said first orbit with said propulsion engines on said second and third vehicles.

33. A reusable launch system comprising:
 first, second, and third reusable vehicles connected together and each having a fuel supply and a propulsion engine, characterized in that:
 said first vehicle is operable to propel said first, second and third vehicles from a launch site to a first staging location below low earth orbit using said propulsion engine on said first vehicle, separate from said second and third vehicles at said first staging position, and non-destructively return to earth independently of said second and third vehicles;
 said second vehicle is operable to propel said second and third vehicles from said first staging location to a first orbit using said propulsion engine on said second vehicle, separate from said third vehicle at said first orbit, and non-destructively return to earth independently of said first and third vehicles;
 said third vehicle is operable to independently propel itself from said first orbit to a second orbit higher than said first orbit using said propulsion engine on said third vehicle, non-destructively return to earth independently of said first and second vehicles, and at least one of deliver a payload in orbit and retrieve a payload in orbit;
 said first vehicle has an external geometry, said second vehicle has an external geometry that is substantially the same as said external geometry of said first vehicle, and said third vehicle has an external geometry that is substantially the same as said external geometries of said first and second vehicles; and
 said third vehicle is at least one of a cargo carrying vehicle and a crew carrying vehicle.

34. The system of claim 33, wherein said first vehicle has an avionics hardware package, said second vehicle has an avionics hardware package that is substantially the same as said avionics hardware package on said first vehicle, and said third vehicle has an avionics hardware package that is substantially the same as said avionics hardware packages of said first and second vehicles.

35. The system of claim 33, wherein said propulsion engines on said first, second and third vehicles are substantially the same.

36. The system of claim 33, wherein said first vehicle has landing gear, said second vehicle has landing gear that is substantially the same as said landing gear on said first vehicle, and said third vehicle has landing gear that is substantially the same as said landing gear on said first and second vehicles.

37. The system of claim 33, wherein said second vehicle is operable to assist in propelling said first, second and third vehicles from said launch site to said first staging location using said propulsion engine on said second vehicle.

38. The system of claim 37, wherein said third vehicle is operable to assist in propelling said first, second and third vehicles from said launch site to said first staging location using said propulsion engine on said third vehicle.

39. The system of claim 33, wherein said third vehicle is operable to assist in propelling said second and third vehicles from said first staging location to said first orbit using said propulsion engine on said third vehicle.

40. The system of claim 33, wherein said cargo carrying vehicle has a payload bay and said crew carrying vehicle is substantially said cargo carrying vehicle with passenger module in said payload bay.

* * * * *